United States Patent
Seong

(10) Patent No.: US 7,447,853 B2
(45) Date of Patent: Nov. 4, 2008

(54) DATA COPY DEVICE

(75) Inventor: Goan-Soo Seong, Seoul (KR)

(73) Assignee: Nextodi Co., Ltd., Suwon (KR)

(*) Notice: Subject to any disclaimer, the term of this patent is extended or adjusted under 35 U.S.C. 154(b) by 233 days.

(21) Appl. No.: 10/598,293

(22) PCT Filed: Mar. 4, 2005

(86) PCT No.: PCT/KR2005/000617

§ 371 (c)(1),
(2), (4) Date: Aug. 23, 2006

(87) PCT Pub. No.: WO2005/086007

PCT Pub. Date: Sep. 15, 2005

(65) Prior Publication Data

US 2007/0180205 A1     Aug. 2, 2007

(30) Foreign Application Priority Data

Mar. 5, 2004     (KR) .................. 10-2004-0014963

(51) Int. Cl.
*G06F 12/00* (2006.01)

(52) U.S. Cl. ........................... 711/162

(58) Field of Classification Search ............... None
See application file for complete search history.

(56) References Cited

U.S. PATENT DOCUMENTS

| | | | |
|---|---|---|---|
| 5,835,954 A * | 11/1998 | Duyanovich et al. | 711/162 |
| 6,292,852 B1 * | 9/2001 | Bodo et al. | 710/20 |
| 2007/0070857 A1 * | 3/2007 | Chen et al. | 369/85 |

FOREIGN PATENT DOCUMENTS

| | | |
|---|---|---|
| JP | 56-019166 | 2/1981 |
| KR | 1003332990000 | 4/2002 |
| TW | 470933 | 1/2002 |

* cited by examiner

*Primary Examiner*—Hiep T Nguyen
(74) *Attorney, Agent, or Firm*—IPLA P.A.; James E. Bame

(57) ABSTRACT

The invention relates to a data copy device engaged between two storage media each connected to an IDE or IDE-compatible interface, especially relates to a data copy device which requires both minimal memory usage and minimal control burden, and further provides much enhanced data copying speed, i.e. more or less double speed. According to the present invention, the data copy device is advantageous in that lower price may be attained by minimal memory and minimal power control module, and higher copy speed can be simultaneously attained.

10 Claims, 5 Drawing Sheets

FIG. 2

IDE Function Allocation Address Table (200)

| Address | | | | | Functions | |
|---|---|---|---|---|---|---|
| CS0- | CS1- | DA2 | DA1 | DA0 | Read (DIOR-) | Write (DIOW-) |
| N | N | x | x | x | Data bus high impedance | Not used |
| | | | | | Control block registers | |
| N | A | 0 | x | x | Data bus high impedance | Not used |
| N | A | 1 | 0 | x | Data bus high impedance | Not used |
| N | A | 1 | 1 | 0 | Alternate Status | Device Control |
| N | A | 1 | 1 | 1 | * * * | Not used |
| | | | | | Command block registers | |
| A | N | 0 | 0 | 0 | Data | Data |
| A | N | 0 | 0 | 1 | Error | Features |
| A | N | 0 | 1 | 0 | Sector Count | Sector Count |
| A | N | 0 | 1 | 1 | Sector Number | Sector Number |
| A | N | 1 | 0 | 0 | Cylinder Low | Cylinder Low |
| A | N | 1 | 0 | 1 | Cylinder High | Cylinder High |
| A | N | 1 | 1 | 0 | Device/Head | Device/Head |
| A | N | 1 | 1 | 1 | Status | Command |
| A | A | x | x | x | Invalid address | Invalid address |

[ SEL = 1, READ Operation ]

DATA COPY DEVICE

TECHNICAL FIELD

The present invention relates to a data copy device for use in copying data between two storage media connected to an IDE or IDE-compatible interface, and more particularly, to a data copy device that minimizes the duty of a control module and the use of memory and has an enhanced copying speed about twice as fast as a conventional data copy device.

BACKGROUND ART

Conventionally, a device for providing a data copy function between two storage media has been used for the purpose of data backup or the like. For example, an external hard disk, ASKA Tripper USB20PS1, recently released onto the market by ASKA in Japan, is a typical example of the data copy device. The ASKA Tripper USB20PS1 provides an additional slot adapter for a CF memory card, a smart media, a memory stick, an MMC card, an SD card and the like, thereby providing a function by which data are backed up from a variety of memory modules used by a digital camera and the like to an internal hard disk.

FIG. 1 is a block diagram illustrating a configuration of a conventional data copy device where a source medium 140 and a target medium 150 are connected to a control module 110 through an IDE interface 130. It is assumed herein that data are copied from the source medium 140 to the target medium 150. In view of the properties of the IDE interface 130, the source medium 140 and the target medium 150 share the same IDE bus and are identified only by different device numbers. In order to perform data copy, the control module 110 reads data from the source medium 140 and temporarily stores the data in a memory 120, and then reads data again from the memory 120 and writes the data in the target medium 150.

According to the conventional data copy device, two read operations and two write operations should be performed to copy data from the source medium 140 to the target medium 150. Thus, there is a problem in that the data copying speed is low as a whole. Furthermore, in order to enhance the performance of data copy felt by a user, a buffer memory 120 with considerable capacity should be prepared and a high performance control module 110 should also be used. Therefore, there is a problem in that the price of a product inevitably becomes high.

DISCLOSURE OF INVENTION

An object of the invention is to provide a data copy device for use in copying data between two storage media connected to an IDE or IDE-compatible interface, wherein the duty of a control module and the use of memory can be minimized and an enhanced copying speed about twice as fast as a conventional data copy device can be achieved.

BRIEF DESCRIPTION OF DRAWINGS

FIG. 2 shows a function allocation address table according to IDE specifications.

BEST MODE FOR CARRYING OUT THE INVENTION

Hereinafter, embodiments of the present invention will be described in detail with reference to the accompanying drawings.

FIG. 2 shows a function allocation address table 200 according to IDE specifications. The operation procedure of accessing a source medium 140 and a target medium 150 by a control module 110 will be explained in greater detail.

The control module 110 is connected to the source medium 140 and the target medium 150 through an IDE interface 130 and operates the media as required. Specifically, the control module selects and accesses a specific storage medium 140 or 150, which is currently connected to an IDE bus, by using signal lines CS[1:0] and AD[2:0] of an IDE bus, and then performs operations such as device control, device status monitoring, and data read/write on the selected storage medium. FIG. 2 shows an address table for performing such operations.

Figure 1:
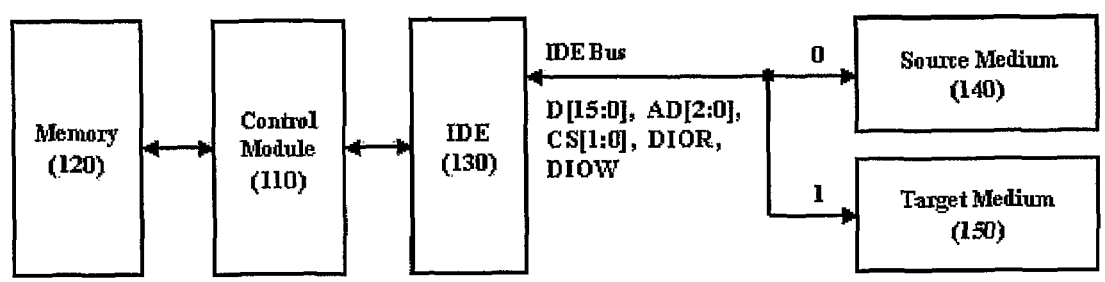
FIG. 1 is a block diagram illustrating a configuration of a conventional data copy device.

For example, a case where the control module 110 reads data from a specific physical area of the source medium 140 will be explained. First, the control module 110 sets up parameters by accessing a Command Block Register. Since the source medium 140 is connected to DEVICE 0, as shown in FIG. 1, the Device field at the address of [A, N, 1, 1, 0] is set to '0', and the address of the specific physical area is set in Sector Count, Sector Number, Cylinder Low, Cylinder High, and Head fields.

Next, a value corresponding to READ is set in the Command register at the address of [A, N, 1, 1, 1], and it is confirmed whether the source medium 140 is in Ready state by reading the Alternate Status register at the address of [N, A, 1, 1, 0] or the Status register at the address of [A, N, 1, 1, 1]. If the source medium 140 is in Ready state, the address of CS[1:0], AD[2:0] is finally set to Data state, i.e., [A, N, 0, 0, 0], and a DIOR signal is sent to the source medium 140, so that data read is accomplished as desired. Meanwhile, in case of data write, the operation is very similar to the data read operation. However, a DIOW signal is sent to a medium in the last step.

Figure 3A:
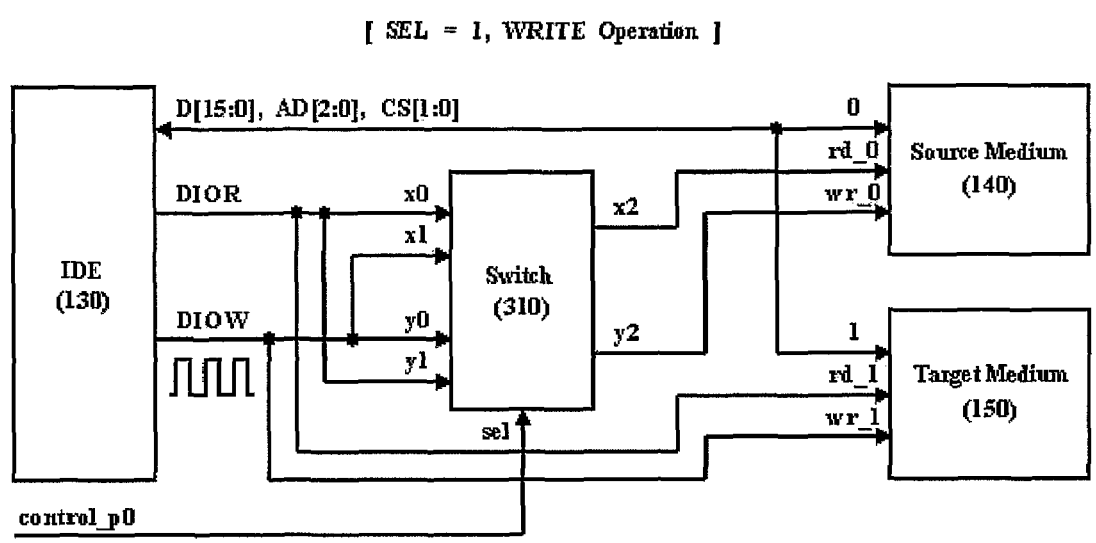
FIGS. 3a and 3b are block diagrams illustrating configurations of data copy devices according to embodiments of the present invention.
Figure 3B:
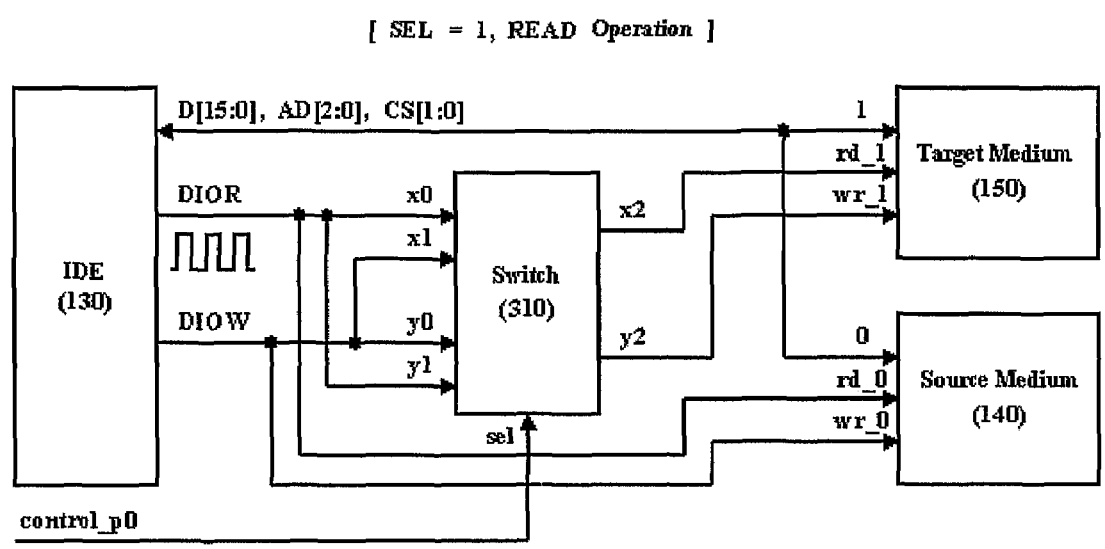

FIGS. 3a and 3b are block diagrams illustrating configurations of data copy devices according to embodiments of the invention.

An embodiment shown in FIG. 3a will be first described. Contrary to the prior art shown in FIG. 1, signal lines D[15:0], AD[2:0] and CS[1:0] of the IDE bus are connected in common to the source medium 140 and the target medium 150, but signal lines DIOR and DIOW for data input/output are connected to the source medium and the target medium through an intermediate switch module 310. That is, in the prior art shown in FIG. 1, a signal combination (DIOR, DIOW) is connected in common to data read/write signal combinations (rd_0, wr_0) and (rd_1, wr_1) for the source medium 140 and the target medium 150. In the present invention shown in FIG. 3a, however, the signal combination is connected directly to the data read/write signal combination (rd_1, wr_1) for the target medium 150 and is switch connected to the data read/write signal combination (rd_0, wr_0) for the source medium 140 via the switch module 310.

The switch module 310 will be described in greater detail below. In response to an external selection input sel, the module outputs an input signal combination (x0, y0) (if sel=0) or an input signal combination (x1, y1) (if sel=1) to output terminals x2 and y2. In the configuration shown in FIG. 3a, a data input/output signal combination (DIOR, DIOW) is connected to input terminals x0 and y0, a data input/output signal combination (DIOW, DIOR) is connected to input terminals x1 and y1, and a data read/write signal combination (rd_0, wr_0) for the source medium 140 is connected to output terminals x2 and y2. Accordingly, when the external selection input sel is '0', the signal combination (DIOR, DIOW) is provided as the signal combination (rd_0, wr_0) for the source medium 140 so that a normal medium access operation is performed. When the external selection input sel is '1', the signal combination (DIOW, DIOR) is provided as the signal combination (rd_0, wr_0) for the source medium 140 SO that a data copying operation is performed according to the invention.

The external selection input sel to the switch module 310 is, for example, determined by an output port control_p0 of the control module 110. In the data copy device according to the present invention, while internal registers are set and read through access to the source medium 140 and target medium 150, the external selection input sel is set to '0'. While data are actually copied from the source medium 140 to the target medium 150, the external selection input sel is set to '1'. In the embodiment shown in FIG. 3a, if the external selection input sel is set to '1' and a write operation is performed, data are copied directly without intervention of the control module 110 as desired. The operation of the data copy device shown in FIG. 3a will be described in detail with reference to the flowchart of FIG. 4.

FIG. 3b is a block diagram illustrating another embodiment according to the present invention. This embodiment is different from the embodiment of FIG. 3a in that signal lines DIOR and DIOW for data input/output are connected directly to the source medium 140 but connected to the target medium 150 via the switch module 310. In the embodiment of FIG. 3b, if the external selection input sel is set to '1' and a read operation is performed, data are copied directly without intervention of the control module 110 as desired. The detailed operation of the data copy device illustrated in FIG. 3b will also be described in detail with reference to the flowchart of FIG. 4.

Figure 4:
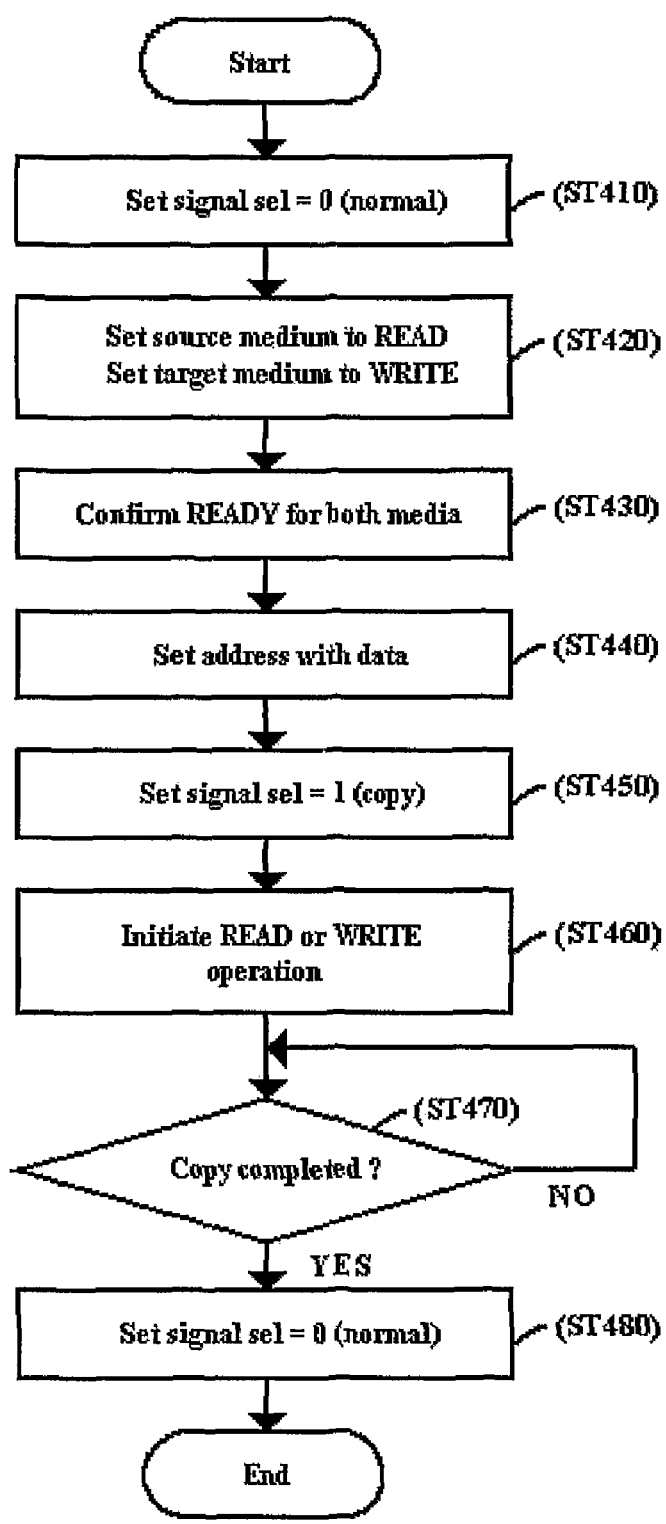
FIG. 4 is a flowchart illustrating the operation procedure of a data copy device according to an embodiment of the invention.

FIG. 4 is a flowchart illustrating the operation procedure of copying data from the source medium 140 to the target medium 150 in a data copy device according to an embodiment of the invention, which is applicable commonly to the embodiments illustrated in FIGS. 3a and 3b. First, the external selection input sel of the switch module 310 or 320 is set to '0' (ST410), whereby a data input/output signal combination (DIOR, DIOW) is connected in common to data read/write signal combinations (rd_0, wr_0; rd_1, wr_1) for the source medium 140 and target medium 150. Accordingly, the control module 110 can normally access the source medium 140 and the target medium 150 via the IDE module 130.

Then, the control module 110 determines the operational parameters for the source medium 140 and the target medium 150 (ST420). This process was described above with reference to FIG. 2. That is, the operational parameters, which relate to physical locations and ranges for a read or write operation at the source medium 140 and the target medium 150, such as values of Device/Head, Sector Count, Sector Number, Cylinder Low and Cylinder High, are set. At this time, the Command register located at the address of [A, N, 1, 1, 1] is set to READ-mode for the source medium 140 and set to WRITE-mode for the target medium 150.

Next, it is confirmed whether both the source medium 140 and the target medium 150 are in Ready state by reading the Alternate Status register at the address of [N, A, 1, 1, 0] and the Status register at the address of [A, N, 1, 1, 1] for the source medium 140 and the target medium 150 (ST430), whereby the source medium 140 is ready to read data at an assigned physical location and the target medium 150 is ready to write data at an assigned physical location. Thereafter, addresses for the source medium 140 and the target medium 150 are set to [A, N, 0, 0, 0], so that both the source medium 140 and the target medium 150 are set to a data read/write-enabled state (ST440).

Then, the external selection input sel to the switch module 310 or 320 is set to '1' (ST450). Thus, as described above, crossed data input/output combination signals are provided to the source medium 140 and the target medium 150 by the switching operation of the switch module 310 or 320. That is, in the embodiment configured as shown in FIG. 3a, combination signals (DIOW, DIOR) and (DIOR, DIOW) are provided to the source medium 140 and the target medium 150, respectively, whereas in the embodiment configured as shown in FIG. 3b, combination signals (DIOR, DIOW) and (DIOW, DIOR) are provided to the source medium 140 and the target medium 150, respectively.

Next, a READ operation (in case of the embodiment illustrated in FIG. 3b) or a WRITE operation (in case of the embodiment illustrated in FIG. 3a) is initiated, so that a combination signal for read control is provided to the source medium 140 and a combination signal for write control is provided to the target medium 150, thereby simultaneously performing a data read operation and a data write operation. That is, in the embodiment of FIG. 3a, the control module 110 provides a data write signal DIOW through the IDE module 130. At this time, with the switching operation of the switch module 310, a data read signal rd_0 is input into the source medium 140 so that the source medium 140 reads data under predetermined conditions and outputs the data to a data bus D[15:0], while a data write signal wr_1 is input into the target medium 150 so that the target medium 150 writes the data, which is on the data bus D[15:0], therein under predetermined conditions. Consequently, the data are copied from the source medium 140 to the target medium 150.

In addition, in the embodiment of FIG. 3b, the control module 110 provides a data read signal DIOR through the IDE module 130. At this time, with the aforementioned switching operation of the switch module 310, a data read signal rd_0 is input into the source medium 140 so that the source medium 140 reads data under predetermined conditions and outputs the data to the data bus D[15:0], while a data write signal wr_1 is input into the target medium 150 so that the target medium 150 writes the data, which is on the data bus D[15:0], therein under predetermined conditions. Consequently, the data are copied from the source medium 140 to the target medium 150.

Meanwhile, in the embodiments of FIGS. 3a and 3b, when the signals DIOW and DIOR are simultaneously provided as the read signal rd_0 for the source medium 140 and the write signal wr_1 for the target medium 150, data are copied as required. Here, it is considered that there is no particular restriction on the other signals, i.e., a write signal wr_0 for the source medium 140 and a read signal rd_1 for the target medium 150. Therefore, the switch modules 310 and 320 of FIGS. 3a and 3b are preferred embodiments of the present invention, and it should be understood that switch modules can be configured variously without departing from the scope and spirit of the present invention.

The internal control operation of the data copy device according to the present invention will be described conceptually. The source medium 140 and the target medium 150 are set to READ-mode and WRITE-mode, respectively; the control signal sel for the switch module 310 is set to '1'; a read operation or a write operation is performed according to the switching configuration; and the data, which have been output by the source medium 140 and is on the data bus D[15:0], are copied directly to the inside of the target medium 150. However, depending on the source medium 140 and the target medium 150, problems may arise if the aforementioned control operations are applied as they are. Possible problems and solutions for the problems will be described below.

That is, the source medium 140 and the target medium 150 are sequentially set to READ-mode and WRITE-mode. Here, there is a possibility that the medium 140 or 150 which has been first set will have an error while operating in DATA mode, contrary to the foregoing. For example, in the embodiment of FIG. 3a, if it is assumed that the source medium 140 is first set to READ-mode and the write medium 150 is then set to WRITE-mode, there is a possibility that the source medium 140 will understand that access to itself has been completed when the control module 110 sets the write medium 150 to WRITE-mode. In such a case, even though a data read signal rd_0 is provided by initiating a write operation in step ST460, an actual read operation is not performed.

Likewise, even if the write medium 150 is first set to WRITE-mode and the source medium 140 is then set to READ-mode, there is a possibility that the write medium 150 will understand that access to itself has been completed when the control module 110 sets the source medium 140 to READ-mode. In such a case, even though a data write signal wr_1 is provided by initiating a write operation in step ST460, an actual read operation for the data on the data bus D[15:0] is not performed while the wr_1 signal is ignored. These problems arise because all devices connected to the IDE bus can gain access in common to the IDE bus signal in view of the properties of the IDE interface, and thus, there is a medium device that determines its own operation mode by considering the contents of access of the other devices.

Accordingly, to secure a stable data copying operation, it is preferred that more or less modifications be made to the configuration of the present invention, which has been described with reference to FIGS. 3a to 4. For example, it is possible to consider a method of using a chip select signal. Among signals provided to the source medium 140 and the target medium 150 through the IDE bus, although not shown in FIGS. 3a and 3b, there is a chip select signal that is generally provided in common to both the source medium 140 and the target medium 150. Since all signals provided while the chip select signal is inactive are ignored by the subject medium 140 and/or 150, the aforementioned problems can be solved using the chip select signal.

That is, the control module 110 prepares an additional ENABLE signal and provides the ENABLE signal in combination with the chip select signal, whereby upon subsequent setting of a mode, the chip select signal for the subject medium 140 or 150 to which the mode setting has been first made can become inactive. Detailed description thereof will be made with reference to the embodiments described above. In the case where the source medium 140 is first set to READ-mode and the target medium 150 is then set to WRITE-mode, the chip select signal for the source medium 140 to which the mode setting has been first made is provided in logical combination with the ENABLE signal by means of AND or OR logic. The control module 110 controls the ENABLE signal in advance when setting the medium 150 to WRITE-mode, so that the chip select signal for the source medium 140 can be set to an inactive state. In this case, the source medium 140 set to the inactive state ignores completely all the contents of mode setting of the medium 150, thereby removing the possibility of occurrence of the aforementioned problems.

Meanwhile, it is also possible to employ a method in which the ENABLE signal is combined with the DIOW signal and the DIOR signal rather than the chip select signal but the other operations are identical to those of the aforementioned method using the chip select signal. In case of using the method of combining the ENABLE signal with the DIOW signal and the DIOR signal, the subject medium 140 or 150 is in an active state but is actually disabled due to the combination of the DIOW signal and the DIOR signal with the ENABLE signal. Thus, the subject medium is set to a state where it is considered that there is no data input/output, thereby obtaining the same results as the method of employing the chip select signal.

Although the technical spirit of the present invention has been described herein based on the IDE interface, it should be understood that the application and scope of the present invention are not limited only to the IDE interface but include various other data copy devices using IDE-compatible interfaces. Accordingly, the term 'IDE interface' used herein including the claims should be construed as meaning 'IDE interface or IDE-compatible interface'.

In addition, for the sake of clarity of the spirit of the present invention, the control module 110, the IDE interface module 130 and the switch module 310 or 320 are illustrated as being separately provided. However, some or all of these components may be designed to be incorporated into a single chip. It should be noted that all these modifications and variations fall within the scope of the present invention.

INDUSTRIAL APPLICABILITY

According to the data copy device of the present invention, there are advantages in that a product can be constructed of a control module having minimal performance and the minimum capacity of memory, resulting in reduced production costs and a high data copying speed.

The invention claimed is:

1. A data copy device for directly copying data from a source medium (140) to a target medium (150) connected in common to an IDE interface, comprising:

an IDE module (130) for providing the IDE interface such that a data bus (D [15: 0]) and an address bus (AD [2:0], CS [1:0]) are connected in common to the source medium and the target medium, and a data input/output signal combination (DIOR, DIOW) is connected to a data read/write signal combination (rd_1, wr_1) for the target medium;

a switch module (310) for selectively providing an IDE read control signal (DIOR) or an IDE write control signal (DIOW) of the IDE interface as a data read signal (rd_0) for the source medium in response to an external selection input (sel); and a control module (110) which controls the switch module through the external selection input (sel) so that the signal combination (DIOR, DIOW) can be provided as a data read/write signal combination (rd_0, wr_0) for the source medium, sets operational parameters for the source medium and the target medium through the IDE interface such that a Command register of the source medium and a Command register of the target medium are set to READ-mode and WRITE-mode, respectively, confirms whether the source medium and the target medium are in READY states, sets the address bus to DATA-mode, controls the switch module so that the IDE write control signal (DIOW) can be provided as a data read signal (rd_0) for the source medium, and provides the IDE write control signal (DIOW) to initiate data copy from the source medium (140) to the target medium (150).

2. The device as claimed in claim 1, wherein the switch module (310) selectively provides a signal combination (DIOR, DIOW) or (DIOW, DIOR) of the IDE interface as the data read/write signal combination (rd_0, wr_0) for the source medium (140).

3. The device as claimed in claim 1, wherein some or all of the IDE module (130), the switch module (310; 320), and the control module (110) are provided in the form of a one-chip.

4. The device as claimed in claim 1, wherein the control module (110) sequentially sets operational parameters for the source medium (140) and the target medium (150) through the IDE interface, a medium (140 or 150) that is first set being defined as an ante-set medium and a medium (150 or 140) that is set later being defined as a post-set medium, and the control module performs control such that a chip select input for the ante-set medium is in inactive mode while setting the operational parameters for the post-set medium after setting the operational parameters for the ante-set medium.

5. The device as claimed in claim 1, wherein the control module (110) sequentially sets operational parameters for the source medium (140) and the target medium (150) through the IDE interface, a medium (140 or 150) that is first set being defined as an ante-set medium and a medium (150 or 140) that is set later being defined as a post-set medium, and the control module performs control such that the data input/out signals (DIOR, DIOW) for the ante-set medium are disabled while setting the operational parameters for the post-set medium after setting the operational parameters for the ante-set medium.

6. A data copy device for directly copying data from a source medium (140) to a target medium (150) connected in common to an IDE interface, comprising:
   an IDE module (130) for providing the IDE interface such that a data bus (D [15: 0]) and an address bus (AD [2: 0], CS [1:0]) are connected in common to the source medium and the target medium, and a data input/output signal combination (DIOR, DIOW) is connected to a data read/write signal combination (rd_0, wr_0) for the target medium;
   a switch module (320) for selectively providing an IDE read control signal (DIOR) or an IDE write control signal (DIOW) of the IDE interface as a data write signal (wr_1) for the target medium in response to an external selection input (sel); and
   a control module (110) which controls the switch module through the external selection input (sel) so that the signal combination (DIOR, DIOW) can be provided as a data read/write signal combination (rd_1, wr_1) for the target medium, sets operational parameters for the source medium and the target medium through the IDE interface such that a Command register of the source medium and a Command register of the target medium are set to READ-mode and WRITE-mode, respectively, confirms whether the source medium and the target medium are in READY states, sets the address bus to DATA-mode, controls the switch module so that the IDE read control signal (DIOR) can be provided as a data write signal (wr_1) for the target medium, and provides the IDE read control signal (DIOR) to initiate data copy from the source medium (140) to the target medium (150).

7. The device as claimed in claim 6, wherein the switch module (320) selectively provides a signal combination (DIOR, DIOW) or (DIOW, DIOR) of the IDE interface as the data read/write signal combination (rd_1, wr_1) for the target medium (150).

8. The device as claimed in claim 6, wherein some or all of the IDE module (130), the switch module (310 ; 320), and the control module (110) are provided in the form of a one-chip.

9. The device as claimed in claim 6, wherein the control module (110) sequentially sets operational parameters for the source medium (140) and the target medium (150) through the IDE interface, a medium (140 or 150) that is first set being defined as an ante-set medium and a medium (150 or 140) that is set later being defined as a post-set medium, and the control module performs control such that a chip select input for the ante-set medium is in inactive mode while setting the operational parameters for the post-set medium after setting the operational parameters for the ante-set medium.

10. The device as claimed in claim 6, wherein the control module (110) sequentially sets operational parameters for the source medium (140) and the target medium (150) through the IDE interface, a medium (140 or 150) that is first set being defined as an ante-set medium and a medium (150 or 140) that is set later being defined as a post-set medium, and the control module performs control such that the data input/out signals (DIOR, DIOW) for the ante-set medium are disabled while setting the operational parameters for the post-set medium after setting the operational parameters for the ante-set medium.

* * * * *